United States Patent
Wachob et al.

(10) Patent No.: US 8,932,039 B1
(45) Date of Patent: Jan. 13, 2015

(54) INJECTION MOLDING MACHINE FOR MANUFACTURING AN ELECTRICALLY HEATED OVER-MOLDED HOSE AND FLUIDIC FITTING ASSEMBLY

(71) Applicant: MJM Industries, Inc., Fairport Harbor, OH (US)

(72) Inventors: Eric S. Wachob, Chardon, OH (US); Steven H. Porath, Painesville, OH (US); James A. Strubbe, Ashtabula, OH (US)

(73) Assignee: MJM Industries, Fairport Harbor, OH (US)

( * ) Notice: Subject to any disclaimer, the term of this patent is extended or adjusted under 35 U.S.C. 154(b) by 3 days.

(21) Appl. No.: 13/932,240

(22) Filed: Jul. 1, 2013

Related U.S. Application Data

(62) Division of application No. 12/977,692, filed on Dec. 23, 2010, now Pat. No. 8,474,123.

(60) Provisional application No. 61/289,764, filed on Dec. 23, 2009.

(51) Int. Cl.
 *B29C 45/16* (2006.01)
 *B29C 33/34* (2006.01)

(52) U.S. Cl.
 CPC ...................................... *B29C 33/34* (2013.01)
 USPC ........ 425/127; 425/129.1; 425/574; 425/575; 264/255

(58) Field of Classification Search
 USPC ........ 425/127, 129.1, 574, 575, 576; 264/255
 See application file for complete search history.

(56) References Cited

U.S. PATENT DOCUMENTS

| | | | | |
|---|---|---|---|---|
| 5,209,889 | A * | 5/1993 | Brown et al. | 264/297.2 |
| 5,219,586 | A * | 6/1993 | Yukihiro et al. | 425/183 |
| 5,773,049 | A * | 6/1998 | Kashiwa et al. | 425/572 |
| 6,139,305 | A * | 10/2000 | Nesch | 425/130 |
| 6,210,148 | B1 * | 4/2001 | Snoeyen | 425/554 |
| 6,709,251 | B2 * | 3/2004 | Payette et al. | 425/112 |
| 6,783,346 | B2 * | 8/2004 | Bodmer et al. | 425/112 |
| 7,309,228 | B2 * | 12/2007 | Lindee et al. | 425/574 |
| 7,314,362 | B2 * | 1/2008 | Lichtinger | 425/112 |
| 7,452,202 | B2 * | 11/2008 | Gram | 425/588 |
| 2010/0171237 | A1 * | 7/2010 | Armbruster | 264/255 |
| 2010/0206415 | A1 | 8/2010 | Ellis et al. | |
| 2010/0276836 | A1 * | 11/2010 | Armbruster et al. | 264/255 |

FOREIGN PATENT DOCUMENTS

FR 2924786 12/2009

* cited by examiner

*Primary Examiner* — Tim Heitbrink
(74) *Attorney, Agent, or Firm* — Hahn Loeser & Parks LLP

(57) ABSTRACT

A injection mold machine including a polymer injection assembly, a mold comprising an mold injection half and an mold ejection half, the mold injection half of the mold aligned with the injection assembly for operable mating therewith and the mold injection half adapted for removable, operable mating with the mold ejection half of the mold when aligned therewith, the mold injection half and mold ejection half forming a mold cavity when clamped together adapted to over-mold a portion of an elongated article, a shuttle table supporting the mold ejection half movable between a first position and a second position, where the mold ejection half is aligned with the mold injection half in the first position, and a first basket movable with the shuttle table positioned to contain a portion of the elongated article being over-molded.

3 Claims, 10 Drawing Sheets

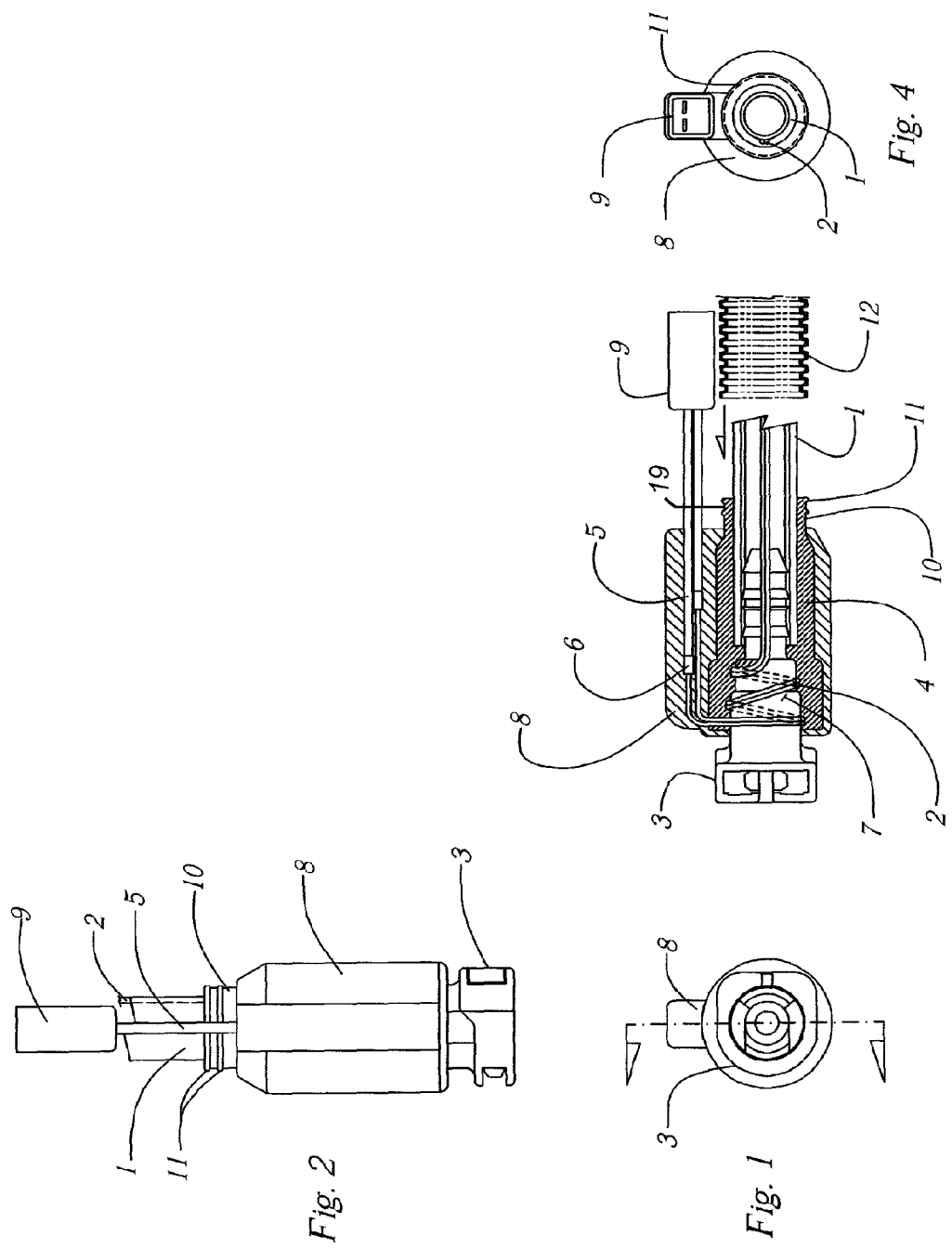

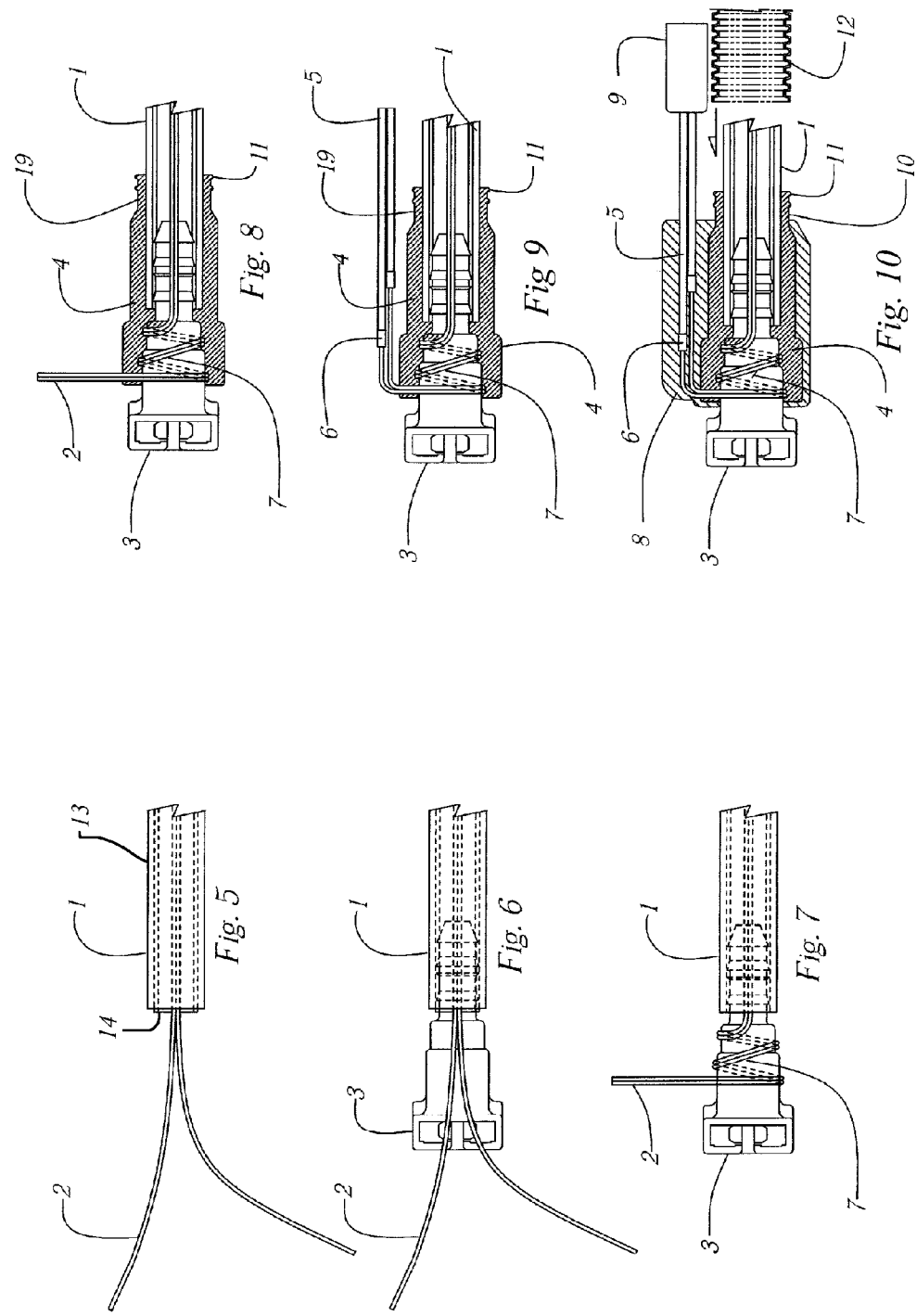

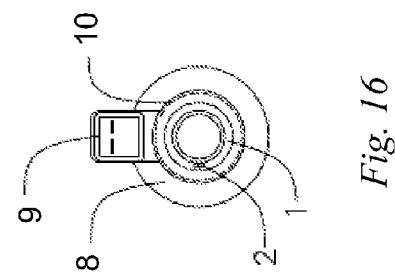
Fig. 14
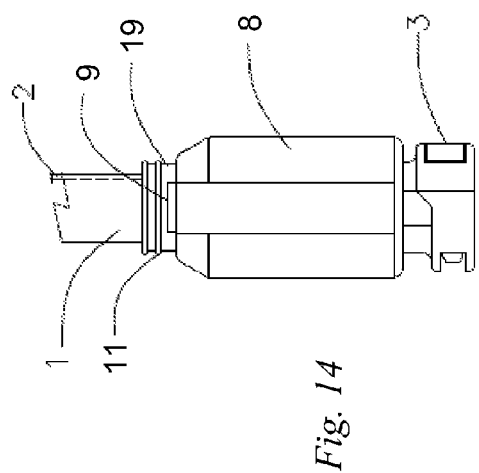
Fig. 13
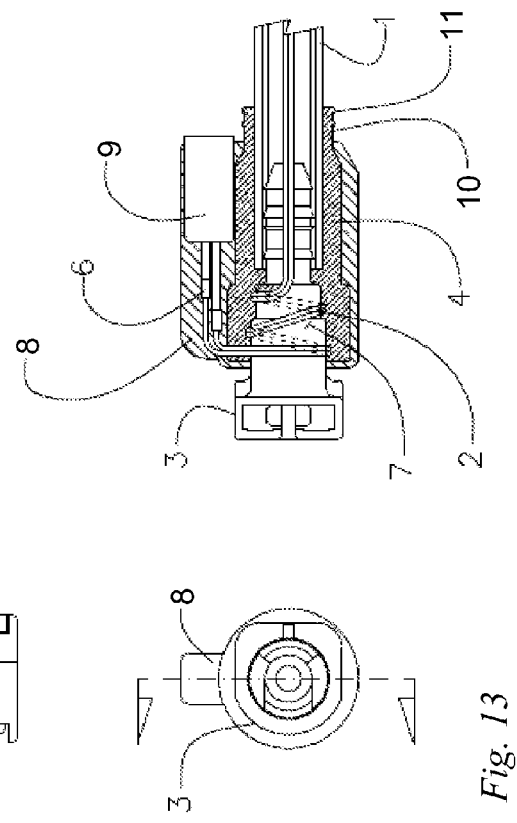
Fig. 15
Fig. 16

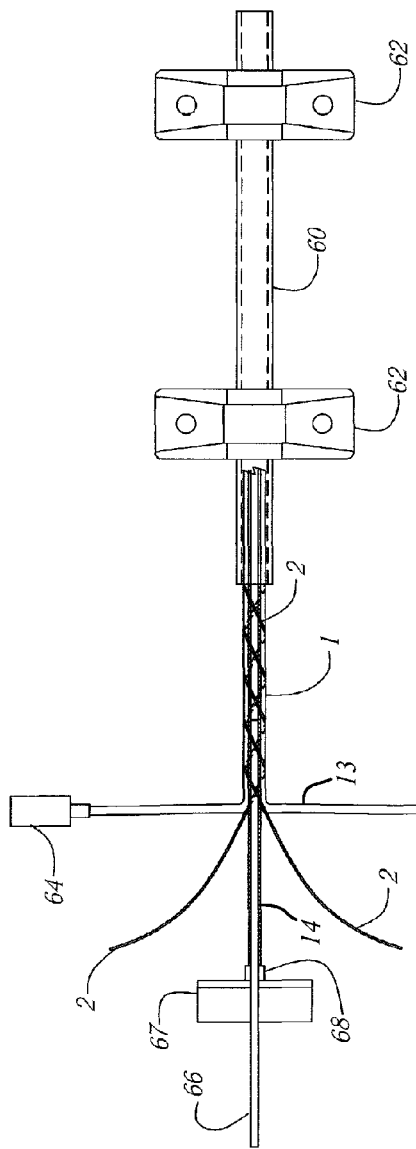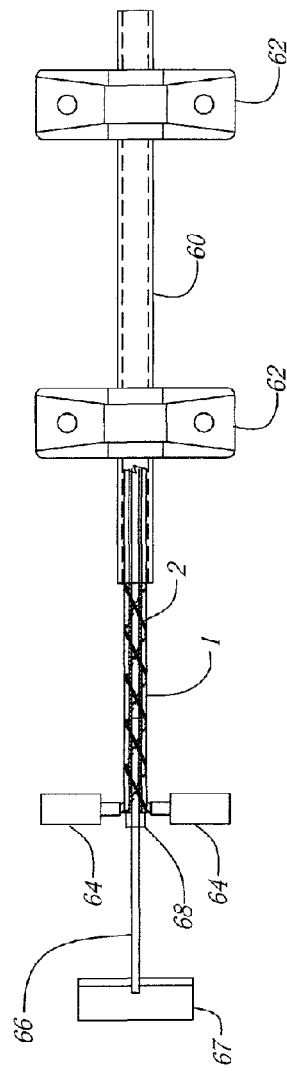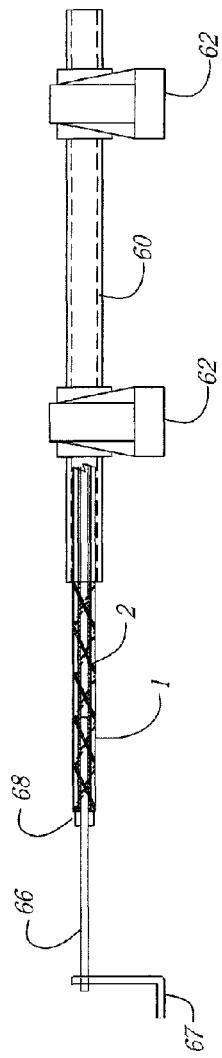

INJECTION MOLDING MACHINE FOR MANUFACTURING AN ELECTRICALLY HEATED OVER-MOLDED HOSE AND FLUIDIC FITTING ASSEMBLY

This application is a divisional of and claims priority to and the benefit of U.S. patent application Ser. No. 12/977,692, filed on Dec. 23, 2010, which claims priority to and the benefit of U.S. Provisional Patent Application 61/289,764, filed Dec. 23, 2009, the disclosure of both of which are incorporated herein by reference.

TECHNICAL FIELD

The present disclosure relates generally to the manufacture of an electrically heated, over-molded fluidic hose and fitting assembly.

BACKGROUND OF THE DISCLOSURE

Due to increased environmental concerns, many governments have now implemented legislation that requires the conditioning of diesel engine exhaust emissions. This is typically accomplished with a urea injection system that sprays urea into several points within the diesel exhaust system. The urea chemically reacts with the diesel exhaust and catalysts to reduce the objectionable emissions of the vehicle.

This system requires hoses to connect the urea tank, pump and injectors to each other. Fluidic hose fittings are typically assembled to the end of the hoses to connect the hoses for various application and mounting configurations. Additionally, the hose assemblies that carry the urea need to be heated to prevent freezing of the urea in cold climates and the subsequent malfunctioning of the emissions system. In the past, electrically heated hoses have been used that have heater wires wrapped around the hose and encapsulated under an outer hose jacket. The heated hose could contain one or more heating wires that heat up when electrical current is passed through them. However, in the past it has been difficult and expensive to provide heating to the fluidic fittings at the ends of the hoses.

Prior methods of producing heated hose and fitting assemblies have involved time-consuming processes that were not consistently reliable. One prior method involved wrapping the heating wires from the hose around the fitting and securing them to the fitting with self amalgamating tape or other self adhesive material. In an alternative prior method, the heating wires from the hose were wrapped around the fitting and then the wires were covered with shrink tube or mechanical clips. Another prior method involved wrapping the heating wires from the attached hose around the fitting and then covering the fitting and wires with a prefabricated mechanical shell. In yet another prior alternative, a separate heater cartridge was installed over the fitting, then the hose heater wires were terminated to this cartridge. The end of the hose, fitting and heater cartridge are then covered with a pre-fabricated mechanical shell. There remains a need in the art to provide a consistently reliable heated hose and fitting assembly at a commercially viable cost.

SUMMARY OF THE DISCLOSURE

We have invented a method of producing an electrically heated, over-molded fluidic hose and fitting assembly. Our process allows electrical heating wires imbedded in a hose to be wrapped around and secured to the fluidic fitting installed in the end of this hose. The fitting and part of the hose is then encapsulated within an over-mold of plastic or other material. Within the over-mold, the hose electrical heater wires may be connected to other wires, typically more flexible wires, which may exit the over-mold and terminated to an electrical connector. Alternatively, the heating wires may be terminated to each other and completely encapsulated in the over-mold. In yet another alternative, the electrical heater wires may be connected to an electrical connector, and the electrical connector at least partially encapsulated in the over-mold. The connector and attached hose can then be electrically powered by a controller.

In one alternative, the method of producing an electrically heated, over-molded fluidic hose and fitting assembly comprises:
  providing a length of electrically heated hose comprising an inner tube, heating wire wrapped around the inner tube, and an outer jacket covering the heating wires;
  exposing a length of heating wire from the hose;
  inserting a fluidic fitting into an end of the hose;
  wrapping the exposed heating wires around the fitting; and
  encapsulating at least a portion of the heating wires around the fluidic fitting in a first over-mold cavity forming a first over-molded layer over a predetermined portion of the fluidic fitting and heating wires with a first polymeric material.

Optionally, the method may include the step of encapsulating at least a portion of the first over-mold in a second over-mold.

A method of over-molding may utilize an injection molding machine comprising:
  a polymer injection assembly
  a mold comprising an mold injection half and an mold ejection half,
  the mold injection half of the mold aligned with the injection assembly for operable mating therewith and the mold injection half adapted for removable, operable mating with the mold ejection half when aligned therewith,
  the mold injection half and mold ejection half forming a mold cavity when clamped together adapted to over-mold a portion of an elongated article,
  a shuttle table supporting the mold ejection half movable between a first position and a second position, where the mold ejection half is aligned with the mold injection half in the first position, and
  a first basket movable with the shuttle table positioned to contain a portion of the elongated article being over-molded.

Also discussed is an injection mold for over-molding a portion of an elongated article comprising:
  a mold comprising a first mold half and a second mold half forming a mold cavity when clamped together adapted to over-mold a portion of an elongated article,
  the mold comprising an egress adapted for the elongated article to pass therethrough,
  a clamp assembly comprising:
  a tensioning plate movable along a guide between a first position and a second position, the tensioning plate comprising a clamp,
  an actuator operably positioned to provide a force on the tensioning plate in the direction of the second position,
  wherein the clamp is adapted to releasably secure the elongated article to the tensioning plate, the force of the actuator providing tension to the elongated article.

BRIEF DESCRIPTION OF THE DRAWINGS

FIG. 1 is an end view of a fluidic hose fitting of the present electrically heated, over-molded fluidic hose and fitting assembly;

FIG. 2 is a top view of the assembly of FIG. 1;

FIG. 3 is a sectional view through FIG. 1 as indicated by the section line and arrows;

FIG. 4 is sectional view through the hose in a direction toward the end of the hose and fitting assembly of FIG. 1;

FIG. 5 is a side view of an end portion of the electrically heated hose;

FIG. 6 is a side view of the hose of FIG. 5 with a fluidic fitting inserted into the hose;

FIG. 7 is a side view of the end portion of the hose with fluidic fitting of FIG. 6 with heating wires wrapped around the fitting;

FIG. 8 is a side view of the end portion of the hose and fitting assembly of FIG. 7 with a first over-mold provided over at least a portion of the assembly;

FIG. 9 is a side view of the end portion of the hose and fitting assembly of FIG. 8 with a length of extension wires spliced to the heating wires;

FIG. 10 is a side view of the end portion of the hose and fitting assembly of FIG. 9 with a second over-mold over at least a portion of the assembly;

FIG. 13 is an end view of an alternative fluidic hose fitting of the present electrically heated, over-molded fluidic hose and fitting assembly;

FIG. 14 is a top view of the assembly of FIG. 13;

FIG. 15 is a sectional view through FIG. 13 as indicated by the section line and arrows;

FIG. 16 is sectional view through the hose in a direction toward the end of the hose and fitting assembly of the alternative assembly of FIG. 13;

FIG. 20 is side view of a device to remove the outer jacket of the electrically heated hose to expose the inner tube;

FIG. 21 is a plan view of the device of FIG. 14 with mechanical grippers attached to the outer jacket;

FIG. 22 is a plan view of the device of FIG. 15 with mechanical grippers retracted to peel away the outer jacket of a portion of the hose;

DETAILED DESCRIPTION OF THE DRAWINGS

Figure 11:
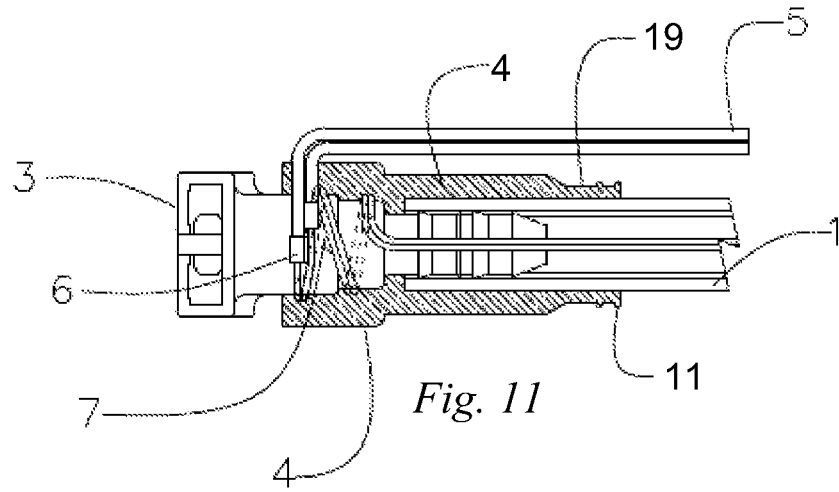
FIG. 11 is a side view of an alternative to the end portion of the hose and fitting assembly of FIG. 8 with a length of extension wires spliced to the heating wires prior to over-molding.

FIGS. 1 through 4 show one embodiment of the hose and fitting assembly, where FIG. 1 is an end view of a fluidic hose fitting 3 of the hose and fitting assembly. FIG. 2 is a top view of the assembly showing an over-mold 8 over an end of an electrically heated hose 1 and the fitting 3. FIG. 3 shows a sectional view through FIG. 1 as indicated by the section line and arrows. For purposes of clarity, the fitting 3 and heating wires 2 were not sectioned in FIG. 3. FIG. 4 is sectional view through the hose 1 toward the end of the hose and fitting assembly.

The hose 1 may be a commercially available electrically heated hose 1 known to those in the art, comprising an inner tube 14, heating wire 2 wrapped spirally around the inner tube 14, and an outer jacket 13 covering the heating wires 2. The hose 1 may contain one or more heating wires 2. These wires heat up when electrical current is passed through them. The hoses can be made in various lengths. The heating output of the hose for a given length is typically changed by varying the gage of the internal heating wires 2 and the pitch of the spiral wrap of these wires within the hose 1.

FIGS. 5 through 10 show one embodiment of the construction method of the assembly. FIG. 5 shows an end portion of the electrically heated hose 1 having a desired length of exposed heating wires 2. The heating wires are exposed as discussed below by removing the outer jacket 13 from a first length of the hose to expose the heating wires 2. Then, the outer jacket 13 and exposed inner tube 14 of the first length of the hose is cut away leaving the exposed heating wires as shown in FIG. 5.

As an example, one device for removing the outer jacket 13 and exposing the inner tube 14 is shown in FIGS. 20 thru 22. FIG. 20 shows a side view of the device, and FIG. 21 shows a top view. In this embodiment, the hose 1 is inserted into a holding tube 60 that rotates on bearings 62. The tube 60 can hold various lengths of hose, and keeps curled hoses straight. A mandrel 66 with a stop collar 68 is inserted into the inner tube of hose 1 and is supported by outboard bearing 67. The spirally wrapped heater wires embedded within the outer jacket create a weak spot in the outer jacket 13 that functions as a tear path. Optionally, the hose jacket may be scored by a knife to produce the tear path. As shown in FIGS. 21 and 22, mechanical grippers 64 are attached to the outer jacket 13 in one or more spots and retracted to pull the hose jacket from the hose in a direction transverse to the hose. Pulling the hose jacket transverse to the hose causes the jacket to peel away along the tear path. In this device, the point on the hose where the hose jacket 13 tears away remains approximately even with the mechanical grippers 64 while the hose 1 rotates in tube 60, and the hose advances through the tube toward the bearing 67 as the jacket 13 is pulled away. As shown in FIG. 22, the pull from the mechanical grippers 64 on the jacket 13 causes the spirally wrapped heater wires 2 to unwind as the hose 1 moves towards bearing 67 while the jacket 13 is peeled away. The tear is stopped when the collar 68 on the mandrel 66 hits the support bearing 67. The initial distance between the stop collar 68 and the bearing 67 is selected to expose a desired length of heating wires 2. Alternatively, the hose jacket 13 may be manually pulled away exposing the desired length of heating wires 2.

After a desired length of heating wire 2 is exposed, the pulled hose jacket 13 and exposed inner tube 14 is cut away exposing a length of heating wire from the hose as shown in FIG. 5. Next, a fluidic fitting 3 is attached to the end of hose 1. This may be a press fit as illustrated in FIG. 6. The fitting 3 could be axial as illustrated or an angular fitting as desired for the design requirements of the application.

The heating wires 2 are then wrapped around the fitting 3 and secured with an adhesive 7 as shown in FIG. 7. The adhesive 7 could be cyanoacrylate, hot melt, UV cure, or other suitable adhesive. Alternatively or in addition, the wires could also be secured to fitting 3 with a mechanical clip, tape or tube. In certain applications, a tape may be used such as a Teflon® tape with a silicon adhesive, or other tape product suitable for holding the wires in place during over-molding. Typically, the heating wires 2 have spring-like properties causing the wire to pull away from the fitting 3 and tend to unwind. The adhesive 7 holds the heating wires 2 in place while the wires are encapsulated in plastic or other suitable material in an over-mold.

In the present method, the hose and wire-wrapped fitting assembly is encapsulated in an over-mold to hold the heating wires 2 in place. In one application, the present method includes a "pre-mold" step comprising encapsulating at least a portion of the heating wires around the fluidic fitting in a first over-mold cavity forming a first over-molded layer 4 over a predetermined portion of the fluidic fitting and heating wires with a first polymeric material. FIG. 8 shows one embodiment of the pre-mold geometry around the hose, fitting and heater wires. Optionally, various mechanical devices such as pins or clamps within the encapsulation mold of the pre-mold step may also be used to locate and hold the heating wires 2. Then, at least a portion of the first over-mold is encapsulated in a second over-molded layer 8, i.e. over-mold geometry 8, in an "over-mold" step, having the desired outer geometry such as shown in FIG. 10. When various mechanical devices such as pins or clamps are used to position the heating wires 2 within the encapsulation mold of the pre-mold step, the second over-molded layer 8 preferably covers and seals any apertures or pin recesses remaining after the pre-mold step to inhibit ingress of moisture and other environmental factors into the assembly.

Figure 18:
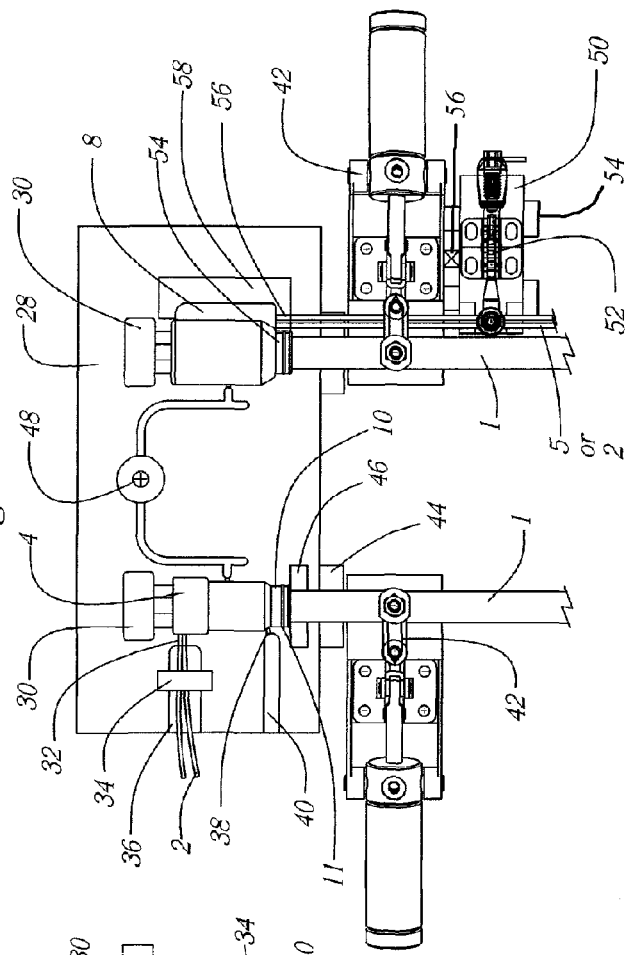
FIG. 18 is a sectional view taken across the parting line as indicated by the section line and arrows in FIG. 17 showing a plan view of one mold plate and showing a plan view of the hose clamping devices for each mold cavity and the wire clamping/tensioning device adjacent the hose clamping device of the right-hand mold cavity, and a plan view of a pre-mold wire hold down device adjacent the left mold cavity.
Figure 19:
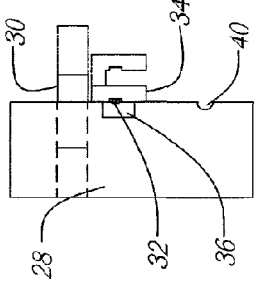
FIG. 19 is a side view of the mold plate of FIG. 18 and the pre-mold wire hold down device adjacent the left mold cavity.
Figure 17:
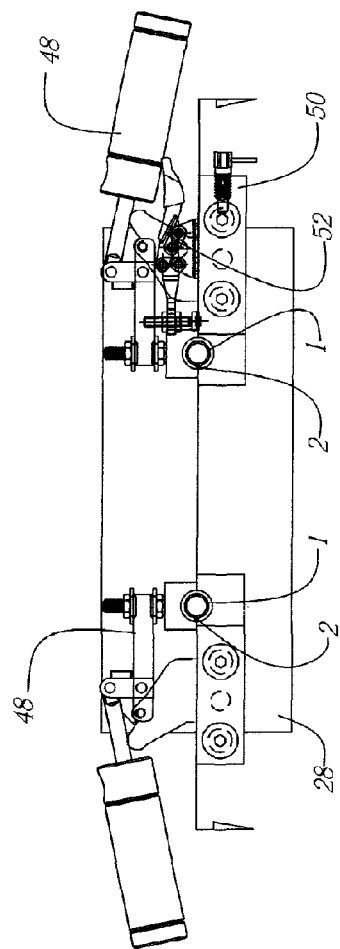
FIG. 17 is a end view of an injection mold for producing the first and second over-molds of the present disclosure showing an end view of the hose clamping devices located outboard of each mold cavity to secure the hose assembly and a wire clamping/tensioning device located outboard of the right-hand mold cavity to secure wires.

FIG. 17 through 19 shows a two-cavity mold for example having a pre-mold cavity on the left side and an over-mold cavity on the right side. FIG. 17 is a front view of the mold, and. FIG. 18 is a view across the parting line of the mold as indicated by the section lines and arrow in FIG. 19. The pre-mold cavity such as shown on the left side of the mold may be designed to provide an injection molding pre-mold process utilizing a low injection pressure molding process and a "zero pressure" pack pressure so as to not dislodge the wires 2 or otherwise damage the assembly. As used here, "zero pressure" means a low pack pressure, such as less than 2 pounds per square inch, and does not necessarily mean zero pounds per square inch. It is contemplated that no pack pressure will be used for the pre-mold step; however, for some over-mold materials selected the injection molding pre-mold process may utilize a suitably higher pack pressure as desired for the over-mold material selected and the over-molding application.

The low injection pressure molding process may use an injection pressure of less than 100 pounds per square inch. In one application, the injection pressure is less than 50 pounds per square inch. Alternatively, the injection pressure is less than 10 pounds per square inch. The over-molding process may include discharging pressure and excess material from the over-mold cavity through an out-gate 38. At least one out-gate 38 may be provided to allow excess material and pressure to exit the mold through runner 40 and allow proper filling while inhibiting dislocating the wires and damaging or flashing around the hose. The out-gate 38 provides an aperture in the cavity forming an outlet in communication with the runner 40, which is vented to the outside of the mold. When the polymeric material is injected into the mold cavity, the displaced air discharges through the out-gate 38 inhibiting pressure build-up in the cavity. Then, as the cavity is filled, excess material also discharges through the out-gate 38. The number and location of out-gates may be varied to provide desired cavity pressure and fill.

In the low pressure pre-molding step, the fitting and hose with the wrapped wires are placed in the pre-mold cavity. Referring now to FIGS. 18 and 19, a lifter 30 may be used to locate the fitting 3. The heater wires 2 exit the mold cavity through a wire shut off 32 and a wire passage 36. The wires are secured in position by hold downs 34. A tight fitting shut-off surface 46 in the mold compressively seals around an outside surface of the hose adjacent the over-mold cavity forming a material shut-off closing the mold cavity and substantially preventing the material injected into the mold from passing thereby, i.e. preventing plastic from flashing down the hose. A hose clamp block 44 squeezes the hose in the mold and prevents the hose from moving during the molding process. Hose clamping devices 42, may be provided in one or more locations outside of the mold along the hose to further secure the hose assembly in location during the mold operation.

The shut-off surface 46 with the clamps 42, 44 provide a three-point clamping arrangement of the hose, or other elongated article being over-molded, to hold the hose in its desired orientation entering the mold. The clamping arrangement provides the desired orientation of the hose or other elongated article entering the mold, reducing dimensional variation, inhibiting distortion of the hose, and maintaining the shut-off 46 around the hose. In the application of FIG. 18, the hose is maintained in a straight line entering the mold. It is contemplated that certain hoses or other elongated articles having arcuate or other curvilinear shapes may be over-molded, and the clamping arrangement may be adapted to hold such elongated article in the desired arcuate or other curvilinear shape as it enters the mold. Although shown as a three-point clamping arrangement, for certain applications a four-point clamping arrangement may be used. Alternatively, only one clamp 42, 44 may be utilized to maintain the desired orientation. The present molding method may include clamping the hose in one or more locations outside of the over-mold cavity along the hose or other elongated article.

Encapsulation material is injected into the sprue and runner system 48 to produce the pre-mold geometry 4. The encapsulation material may be a polymeric material such as a thermoplastic elastomer (TPE), thermoplastic vulcanizate (TPV), thermoplastic rubber (TPR), thermoplastic olefins (TPO), liquid crystal polymer (LCP) or other thermoplastic or thermoset material as desired. In one application, the encapsulation material may be a Zeotherm® TPV. The polymeric material in the first over-molded layer 4 may form a material-to-material bond with the fluidic fitting and/or the hose 1 at the interface therebetween.

For certain applications, it is contemplated that the first over-molded layer 4 may provide a substantially uninterrupted surface inhibiting ingress of moisture and other environmental factors into the assembly. In applications where the first over-molded layer 4 provides the desired finished over-molded geometry and functionality, no further over-molding may be required. Alternatively, the first over-molded layer 4 may be utilized to encapsulate at least a portion of the wires in preparation for a second over-molding step to provide the desired finished geometry and/or functionality.

The first over-molded layer 4, i.e. pre-mold geometry 4, may be designed to provide a sealing surface 10 that acts as a shut off when the over-mold 8 is subsequently molded around the pre-mold at high pressure. The pre-mold geometry 4 may also include a tube mounting surface 19 having mechanical features 11 such as ribs or snap features used to retain a corrugated or other shaped protective tubing 12 such as shown in FIG. 3. Alternatively, the tube mounting surface 19 may also be provided on the over-mold geometry 8.

Figure 12:
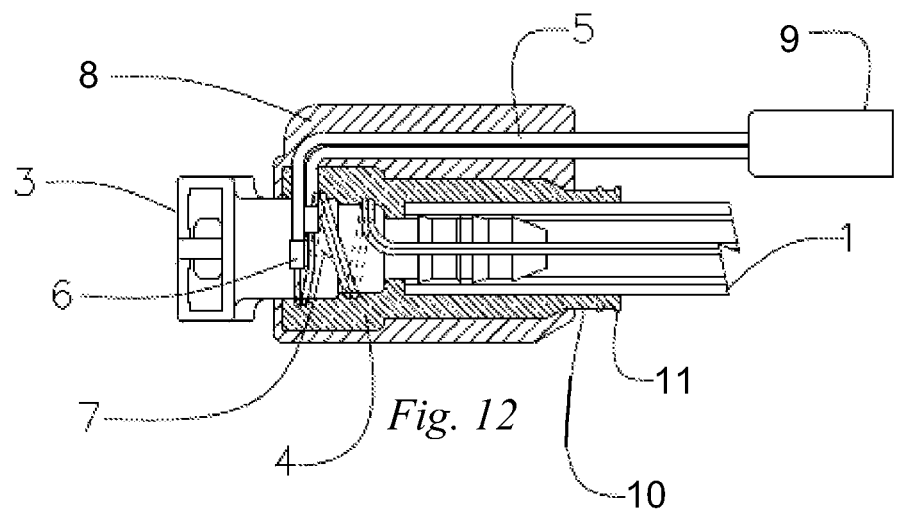
FIG. 12 is a side view of the alternative end portion of the hose and fitting assembly of FIG. 11 with a second over-mold over at least a portion of the assembly.

An extension wire 5, typically more flexible wire than the heating wire and typically of a low resistance, may be attached to the heating wires 2 with a mechanical splice 6 or other method after the pre-mold as illustrated in FIG. 9. Alternatively, an extension wire 5 may be attached to the heating wires 2 with a mechanical splice 6 or other method prior to the pre-mold as illustrated in FIGS. 11 and 12. The splices 6 can be staggered to avoid contact with each other during the final encapsulation or "over-mold" process. The splices 6 could also be covered with an insulating material to prevent contact with each other. Alternatively, the heating wires 2 may not exit the encapsulation material. In this configuration, the heater wires 2 may be spliced to each other and completely encapsulated in the over-mold or the pre-mold. The extension wires 5, or alternatively the electrical heating wires 2, may be connected to an electrical connector 9. The electrical connector may be outside of the second over-mold layer 8 as shown in FIGS. 3 and 10. Alternatively, the electrical connector may be at least partially encapsulated in the over-mold as shown in FIGS. 13 through 16. The connector 9 and attached hose can then be electrically powered by a controller (not shown).

The over-mold cavity such as shown on the right-hand side of the mold block 28 in FIGS. 17 through 19 is the second encapsulation mold, or over-mold. The lifter 30 may be provided to locate and eject the fitting from the mold. A shut off surface 54 compressively seals against the pre-mold sealing surface 10 forming a material shut-off substantially preventing the material injected into the mold from passing thereby. The wires 2 or 5 as desired for the application, are led out of the over-mold and are clamped and sealed at a wire shut off 56. Hose clamping devices 42, may be provided in one or more locations outside of the mold to further secure the hose assembly during the molding operation.

The mold may include a clamp assembly for providing tension on the wire exiting the mold, or for other elongated articles in other over-mold applications. The clamp assembly has a tensioning plate 50 movable along a guide 54 between a first position and a second position. The tensioning plate 50 comprises a clamp 52, and an actuator 56 operably positioned to provide a force on the tensioning plate 50 in the direction of the second position. The clamp 52 is adapted to releasably secure the wire or other elongated article to the tensioning plate 50, and the force of the actuator 56 provides tension to the elongated article. As shown in FIG. 18, the wires 2 or 5 are secured with the clamp 52 to the tensioning plate 50. The guide 54 may be a rod, rail, channel, or other guide along which the tensioning plate 50 moves between the first position and second position. The actuator 56 may be a spring. For example, a spring may be positioned between the tensioning plate 50 and a spring seat that is stationary relative to the tensioning plate 50, and positioned such that the spring is compressed when the tensioning plate is in the first position. Alternatively, the actuator 56 may be an air cylinder or other device to maintain tension on the wires during over-molding. In one embodiment, the actuator provides a tension sufficient to hold the wire as desired in the mold cavity during molding. However, the tension is also selected to accommodate the strength of the wire or other elongated article, splices, and other strength considerations. In one example, the tension is less than 18 pounds. In any event, the tensioning device may be provided with the first over-mold cavity and/or the second over-mold cavity to eliminate slack in the wires during the molding process and thereby prevent the wires from coming to the surface of the mold cavity. The clamping device may also eliminate the need for locating pins or other mechanical devices within the mold to retain the wires. By eliminating such locating pins and other mechanical devices, the over-mold layer may provide a substantially uninterrupted surface inhibiting ingress of moisture and other environmental factors.

The over-mold geometry 8 may be provided in a mold insert 58 installed in the mold base 28 as shown in FIG. 18. As such, various over-mold geometries may be provided by changing the mold insert 58. Additionally, the over-mold geometry may be reduced in volume when the wires do not exit the over-mold by changing the mold insert 58. The shape of the over-mold geometry may be varied as desired for different applications, mounting configurations, or other customer requirements. The over-mold material may be a polymeric material such as a thermoplastic elastomer (TPE), thermoplastic vulcanizate (TPV), thermoplastic rubber (TPR), thermoplastic olefins (TPO), liquid crystal polymer (LCP), or other thermoplastic or thermoset material as desired. In one application, the encapsulation material may be a Zeotherm® TPV. The polymeric material in the second over-molded layer 8 may form a material-to-material bond with the polymeric material in the first over-molded layer 4 and/or the fluidic fitting, and/or the hose 1 at the interface therebetween.

While FIGS. 17 through 19 show the pre-mold and over-mold cavities in the same mold, it is contemplated that higher volume production will use a multi-cavity pre-mold and a separate multi-cavity over-mold. Additionally, the present over-molding process may utilize a shuttle mold having a plurality of ejection side mold halves and one or more stationary injection mold half. As known by one in the art, the plurality of ejection side mold halves are secured to a shuttle table movable transverse to the stationary injection mold half. The shuttle table aligns one ejection side mold half with the stationary injection mold half for a molding cycle. Then, the shuttle table moves to present another ejection side mold half with the stationary injection mold half for the next molding cycle, during which the previously molded part is removed from the prior used ejection side mold half.

Figure 23:
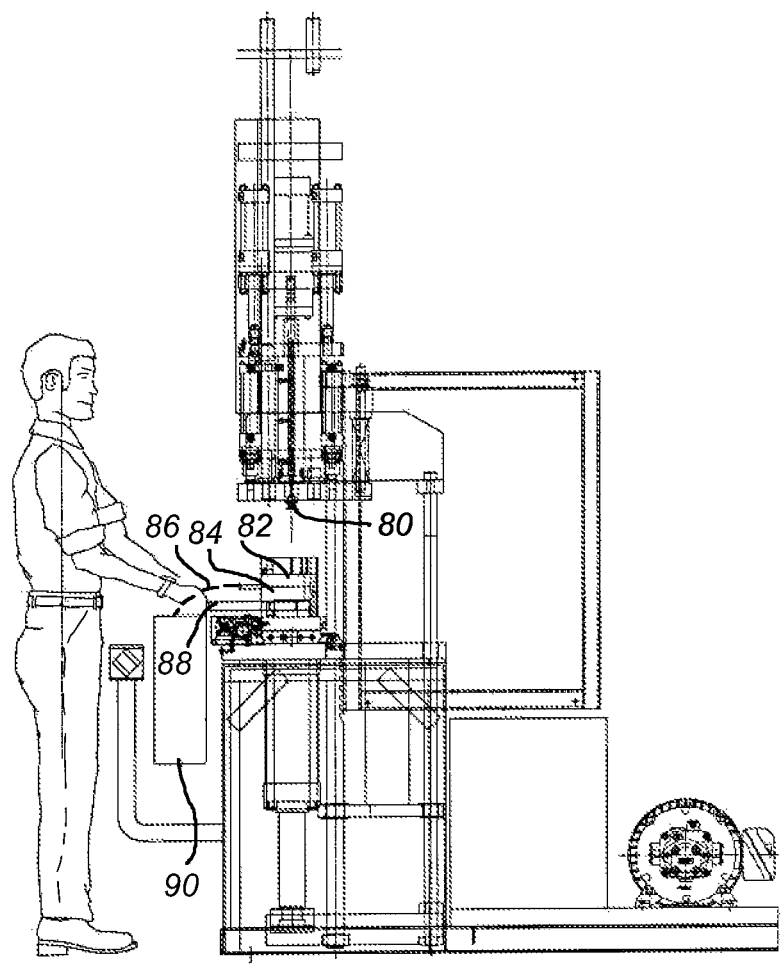
FIG. 23 is a side view of an injection mold machine of the present disclosure.
Figure 24:
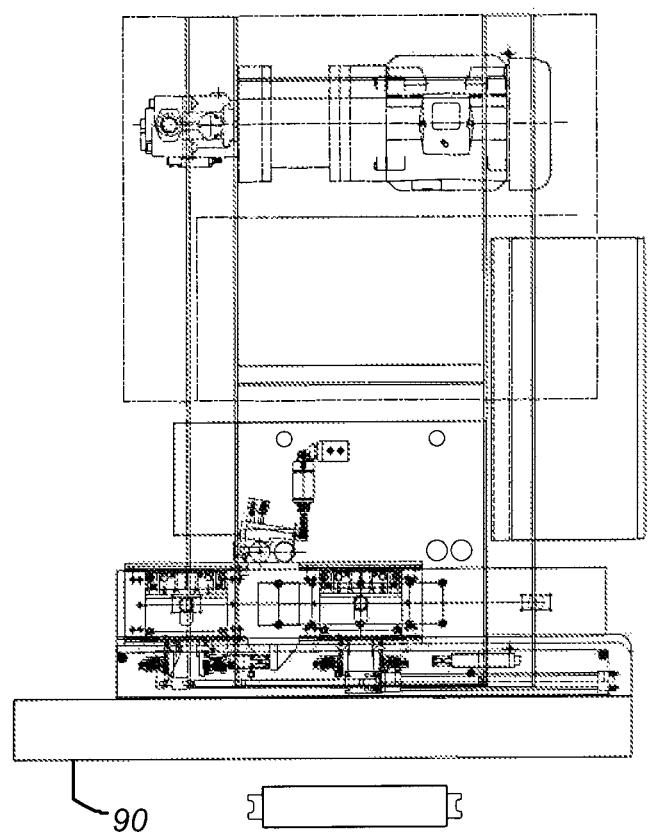
FIG. 24 is a top view of the injection mold machine of FIG. 23.
Figure 25:
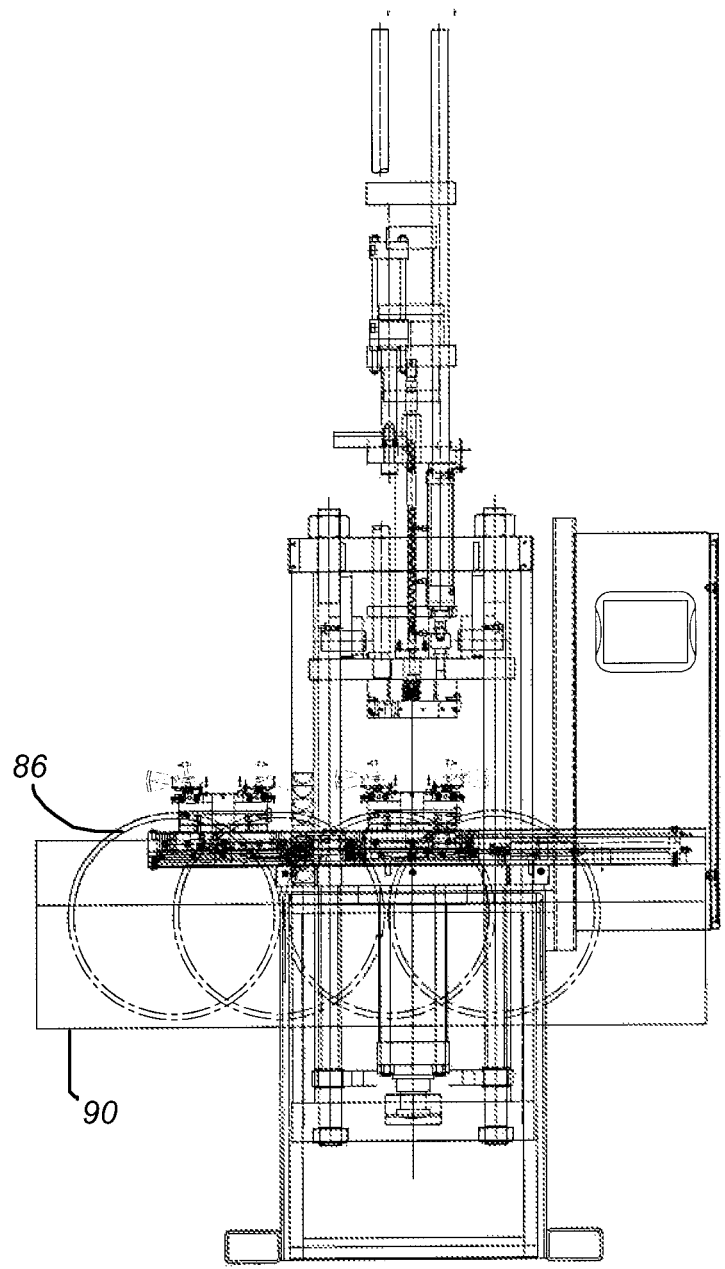
FIG. 25 is a front view of the injection mold machine of FIG. 23.

Referring now to FIGS. 23 through 25, the present over-molding process may utilize a shuttle injection molding machine comprising a polymer injection assembly 80, and a mold having an mold injection half 82 and an mold ejection half 84, the mold injection half 82 aligned with the injection assembly 80 for operable mating therewith and the mold injection half 82 adapted for removable, operable mating with the mold ejection half 84 when aligned therewith. The polymer injection assembly 80 may be in a vertical or horizontal orientation. The mold injection half 82 and mold ejection half 84 form a mold cavity when clamped together adapted to over-mold a portion of an elongated article, such as a hose, wire, cable, extrusion profile, or other elongated article. The injection molding machine also includes a shuttle table 88 supporting the mold ejection half 84 movable between a first position and a second position, where the mold ejection half 84 is aligned with the mold injection half 82 in the first position. The shuttle table may be adapted to move in a linear or rotary movement. Also provided is a basket 90 movable with the shuttle table 88 positioned to contain a portion of the elongated article being over-molded. The elongated article being over-molded may exit the mold cavity and extend into the basket 90, the path of which is represented by reference 86 in FIGS. 23 and 25.

The mold may include a second mold ejection half 84 supported by the shuttle table 88, where the second mold ejection half 84 is aligned with the mold injection half 82 in the second position. As discussed above, the shuttle table 88 aligns one mold ejection half 84 with the stationary mold injection half 82 for a molding cycle. Then, the shuttle table 88 moves to present the second mold ejection half 84 with the mold injection half 82 for the next molding cycle, during which the previously molded part is removed from the first mold ejection half 84.

In one application, a plurality of baskets 90 are provided, each aligned with one or more mold cavities on the shuttle table. In one example, two mold ejection half 84 are provided, each mold ejection half 84 having two cavities, and four baskets 90 are provided, each aligned with a mold cavity. In another example, two mold ejection half 84 are provided, each mold ejection half 84 having two cavities, and two baskets 90 are provided, each aligned with a mold ejection half 84.

Figure 26:
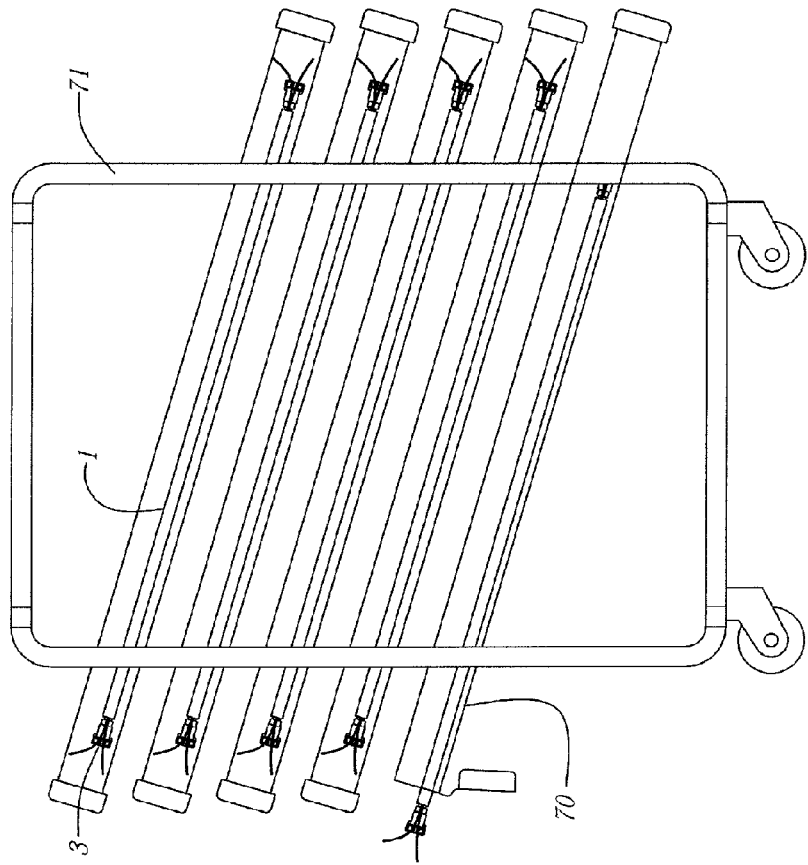
FIG. 26 is an end view of the cart of FIG. 25.
Figure 27:
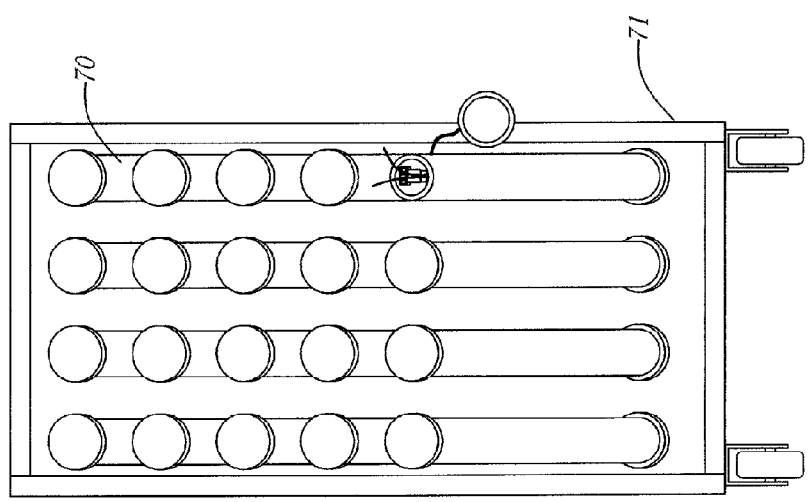
FIG. 27 is an end view of the cart of FIG. 26.

In one embodiment, to keep the hoses clean during manufacturing, the hoses may be stored and transported in tubes 70 that accommodate various lengths and allow for easy handling. These tubes could be mounted on carts 71 as illustrated in FIGS. 26 and 27.

In one alternative, the method of producing an electrically heated, over-molded fluidic hose and fitting assembly comprises:
 providing a length of electrically heated hose comprising an inner tube, heating wire wrapped around the inner tube, and an outer jacket covering the heating wires;
 exposing a length of heating wire from the hose;
 inserting a fluidic fitting into an end of the hose;
 wrapping the exposed heating wires around the fitting; and
 encapsulating at least a portion of the heating wires around the fluidic fitting in a first over-mold.

Optionally, the method may include the step of encapsulating at least a portion of the first over-mold in a second over-mold.

The presently disclosed method of producing an electrically heated, over-molded fluidic hose and fitting assembly is an improvement over prior methods in that:

A) No separate heater cartridge is used to heat the fitting. The hose heater wires are wrapped in contact to the fitting and transmit heat to the fitting.
B) The over-mold provides a very durable mechanical encapsulation, impervious to water and other elements. The over-mold material bonds to the hose jacket and fitting. The over-mold may be mechanically stronger than the fitting or hose and well suited for the harsh environment found on an exposed vehicle chassis.

What is claimed is:

1. An injection molding machine comprising:
 a polymer injection assembly,
 a mold comprising an mold injection half and an mold ejection half,
  the mold injection half of the mold aligned with the injection assembly for operable mating therewith and the mold injection half adapted for removable, operable mating with the mold ejection half of the mold when aligned therewith,
 the mold injection half and mold ejection half forming a mold cavity when clamped together adapted to over-mold a portion of an elongated article,
 a shuttle table supporting the mold ejection half movable between a first position and a second position, where the mold ejection half is aligned with the mold injection half in the first position, and
 a first basket movable with the shuttle table positioned to contain a portion of the elongated article being over-molded.

2. The injection molding machine according to claim 1, the mold further comprising:
 a second mold ejection half supported by the shuttle table, where the second mold ejection half is aligned with the mold injection half in the second position.

3. The injection molding machine according to claim 2, further comprising:
 a second basket movable with the shuttle table positioned to contain a portion of the elongated article being over-molded,
 where the first basket is positioned adjacent the first mold ejection half and the second basket is positioned adjacent the second mold ejection half.

* * * * *